United States Patent
Wu et al.

(10) Patent No.: US 9,495,752 B2
(45) Date of Patent: Nov. 15, 2016

(54) MULTI-BONE SEGMENTATION FOR 3D COMPUTED TOMOGRAPHY

(71) Applicants: Dijia Wu, North Brunswick, NJ (US); Neil Birkbeck, Sunnyvale, CA (US); Michal Sofka, Franklin Park, NJ (US); Meizhu Liu, Plainsboro, NJ (US); Shaohua Kevin Zhou, Plainsboro, NJ (US)

(72) Inventors: Dijia Wu, North Brunswick, NJ (US); Neil Birkbeck, Sunnyvale, CA (US); Michal Sofka, Franklin Park, NJ (US); Meizhu Liu, Plainsboro, NJ (US); Shaohua Kevin Zhou, Plainsboro, NJ (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 180 days.

(21) Appl. No.: 13/953,825

(22) Filed: Jul. 30, 2013

(65) Prior Publication Data

US 2014/0086465 A1  Mar. 27, 2014

Related U.S. Application Data

(60) Provisional application No. 61/706,342, filed on Sep. 27, 2012.

(51) Int. Cl.
   *G06T 7/00* (2006.01)

(52) U.S. Cl.
   CPC ............ *G06T 7/0079* (2013.01); *G06T 7/0012* (2013.01); *G06T 7/0081* (2013.01); *G06T 7/0087* (2013.01); *G06T 2207/10072* (2013.01); *G06T 2207/20041* (2013.01); *G06T 2207/20076* (2013.01)

(58) Field of Classification Search
   None
   See application file for complete search history.

(56) References Cited

U.S. PATENT DOCUMENTS

| | | | |
|---|---|---|---|
| 7,916,919 B2 | 3/2011 | Zheng et al. | |
| 8,306,305 B2 * | 11/2012 | Porat .................... | G06T 7/0081 382/128 |
| 8,577,130 B2 * | 11/2013 | Dewan ................ | G06K 9/6209 382/108 |

(Continued)

OTHER PUBLICATIONS

Y. Yin, "Multi-surface, multi-object optimal image segmentation: application in 3D knee joint imaged by MR." PhD thesis, University of Iowa, 2010.*

(Continued)

*Primary Examiner* — Matthew Bella
*Assistant Examiner* — Soo Shin

(57) ABSTRACT

Multiple object segmentation is performed for three-dimensional computed tomography. The adjacent objects are individually segmented. Overlapping regions or locations designated as belonging to both objects may be identified. Confidence maps for the individual segmentations are used to label the locations of the overlap as belonging to one or the other object, not both. This re-segmentation is applied for the overlapping local, and not other locations. Confidence maps in re-segmentation and application just to overlap locations may be used independently of each other or in combination.

20 Claims, 5 Drawing Sheets

(56) References Cited

U.S. PATENT DOCUMENTS

| | | | |
|---|---|---|---|
| 2006/0126922 A1* | 6/2006 | Von Berg | G06T 7/0012 382/154 |
| 2008/0044074 A1* | 2/2008 | Jerebko | G06T 7/0083 382/128 |
| 2008/0049999 A1* | 2/2008 | Jerebko | G06T 7/0012 382/128 |
| 2008/0101676 A1 | 5/2008 | Zheng et al. | |
| 2012/0189185 A1 | 7/2012 | Chen et al. | |
| 2013/0272594 A1* | 10/2013 | Zelzer | G06T 3/0043 382/131 |
| 2013/0336553 A1* | 12/2013 | Buisseret | G06T 7/0083 382/128 |
| 2014/0161334 A1* | 6/2014 | Wang | G06K 9/00362 382/131 |

OTHER PUBLICATIONS

Kainmueller et al. "Coupling Deformable Models for Multi-object Segmentation," Biomedical Simulation, Proceedings of the 4th Int. Symposium, ISBMS, London, UK, Jul. 2008, vol. 5104, Lecture Notes in Computer Science, Springer, pp. 69-78.*

Zheng et al. "Four-Chamber Heart Modeling and Automatic Segmentation for 3-D Cardiac CT Volume Using Marginal Space Learning and Steerable Features," IEEE Transactions on Medical Imaging, vol. 27, No. 11, Nov. 2008.*

Timo Kohlberger et al: "Automatic Multi-Organ Segmentation Using Learning-Based Segmentation and Level Set Optimization", Sep. 18, 2011, Medical Image Computing and Computer-Assisted Intervention a Miccai 2011, Springer Berlin Heidelberg, Berlin, Heidelberg. (8 pages).

Fripp J et al.: Automatic Segmentation and Quantitative Analysis of the Articular Cartilages from Magnetic Resonance Images of the Knee:, IEEE Transactions on Medical Imaging, IEEE Service Center, Piscataway, NJ, US, vol. 29, No. 1 Jan. 1, 2010. (10 pages).

Pingkun Yan et al.: "Segmentation of Neighboring Structures by Modeling Their Interaction", Computer Vision and Pattern Recognition Workshop, 2006 Conference on, New York, NY, USA, IEEE, Piscataway NJ, USA, Jun. 17, 2006. (8 pages).

Liu David et al.: "Search Strategies for Multiple Landmark Detection by Submodular Maximization", 2010 IEEE Conference on Computer Vision and Pattern Recognition (CVPR), Jun. 13-18, 2010, San Francisco, CA, USIEEE, Piscataway, NJ, USA. (8 pages).

PCT Search Report mailed Feb. 7, 2014, for PCT Application No. PCT/US2013/062069. (19 pages).

U.S. Appl. No. 13/776,184, filed Feb. 25, 2013.

Y. Zheng et al., "Four-Chamber Heart Modeling and Automatic Segmentation for 3D Cardiac CT Volumes Using Marginal Space Learning and Steerable Features," IEEE Transactions on Medical Imaging, vol. 27, No. 11, pp. 1668-1681, 2008.

V. Kolmogorov et al., "What Energy Functions Can Be Minimized via Graph Cuts?," IEEE Transactions on Pattern Analysis and Machine Intelligence, vol. 26, No. 2, pp. 147-159, 2004.

T. F. Cootes et al., "Active Shape Models—Their Training and Application," Computer Vision and Image Understanding, vol. 61, No. 1, pp. 38-59, 1995.

Y. Boykov et al., "An Experimental Comparison of Min-Cut/Max-Flow Algorithms for Energy Minimization in Vision," IEEE Transactions on PAMI, vol. 26, No. 9, pp. 1124-1137, 2004.

A. Delong et al., "Globally Optimal Segmentation of Multi-Region Objects," International Conference on Computer Vision (ICCV), Kyoto, pp. 1-8, 2009.

Y. Boykov et al., "Graph Cuts and Efficient N-D Image Segmentation," International Journal of Computer Vision, vol. 70, No. 2, pp. 109-131, 2006.

H. Ling et al., "Hierarchical, Learning-based Automatic Liver Segmentation," Proc. CVPR, pp. 1-8, 2008.

J. Zhang et al., "Joint Real-time Object Detection and Pose Estimation Using Probabilistic Boosting Network," Proc. CVPR, pp. 1-8, 2007.

Z. Tu et al., Probabilistic Boosting-Tree: Learning Discriminative Models for Classification, Recognition, and Clustering, Proc. ICCV, vol. 2, pp. 1589-1596, 2005.

Y. Boykov et al., "Fast Approximate Energy Minimization via Graph Cuts," IEEE Transactions on Pattern Analysis and Machine Intelligence, vol. 23, No. 11, pp. 1222-1239, 2001.

A. Myronenko, et al., "Point Set Registration: Coherent Point Drift," IEEE Transactions on Pattern Analysis and Machine Intelligence, vol. 32, No. 12, pp. 2262-2275, 2010.

Wikipedia, the free encyclopedia, "Random Forest," http://en.wikipedia.org/wiki/Random_forest, 4 pages, last modified on Feb. 8, 2013 at 09:46.

L. Grady, "Random Walks for Image Segmentation," IEEE Transactions on Pattern Analysis and Machine Intelligence, vol. 28, No. 11, pp. 1-17, 2006.

L. Breiman, "Random Forests," Statistics Department, University of California, Machine Learning, Kluwer Academic Publishers, Netherlands, vol. 45, pp. 5-32, 2001.

* cited by examiner

MULTI-BONE SEGMENTATION FOR 3D COMPUTED TOMOGRAPHY

RELATED APPLICATIONS

The present patent document claims the benefit of the filing date under 35 U.S.C. §119(e) of Provisional U.S. Patent Application Ser. No. 61/706,342, filed Sep. 27, 2012, which is hereby incorporated by reference.

TECHNICAL FIELD

This disclosure relates in general to the field of computed tomography (CT), and, more particularly, to automatic bone segmentation using computed tomography.

BACKGROUND

CT may scan a volume of a patient. Different objects may be adjacent to each other in the volume. The CT data from the scan represents both objects. To assist in diagnosis, planning, or implant design, the objects may be segmented. For example, segmentation of human bones from three-dimensional (3D) CT images is important to many clinical applications such as visualization enhancement, disease diagnosis, implant design, cutting guide design, and surgical planning. The locations or voxels associated with each object are determined.

Hand tracing of the objects, especially in three-dimensions, is time consuming. Automatic detection remains a very challenging task due to the variety and complexity of bone structures, non-uniform density of bone tissues, blurred and weak bone boundaries due to the partial volume effect, and pathological cases such as osteoporosis. In particular, when neighboring bones are too close to each other, the separation of these bones becomes very difficult as the inter-bone gap is extremely narrow or even disappears if the bones border on each other. Consequently, traditional segmentation methods often produce overlapping boundaries. FIG. 1 shows a femur (upper) and tibia (lower) with automated segmentation resulting in a region 40 of overlapping boundaries. The segmentation may not be accurate due to this overlap error.

SUMMARY

By way of introduction, the preferred embodiments described below include methods, systems, instructions, and computer readable media for multiple object segmentation for three-dimensional computed tomography. The adjacent objects are individually segmented. Overlapping regions or locations designated as belonging to both objects may be identified. Confidence maps for the individual segmentations are used to label the locations of the overlap as belonging to one or the other object, not both. This re-segmentation is applied for the overlapping local, and not other locations. Confidence maps in re-segmentation and application just to overlap locations may be used independently of each other or in combination.

In a first aspect, a method is provided for multiple bone segmentation for three-dimensional computed tomography. Computed tomography (CT) data representing first and second bones of a patient is received. A processor segments separately the first and second bones. The processor refines the segmenting of the first bone as a function of a first confidence map of the segmenting and the second bone as a function of a second confidence map of the segmenting. The processor adjusts results of the segmenting of the first and second bones jointly as a function the first and second confidence maps. An image showing the first and second bones with the adjusted results of the segmenting is output.

In a second aspect, a non-transitory computer readable storage medium has stored therein data representing instructions executable by a programmed processor for multiple object segmentation for three-dimensional computed tomography. The storage medium includes instructions for labeling first voxels of computed tomography data as belonging to a first segment have a first boundary, labeling second voxels of computed tomography data as belonging to a second segment having a second boundary, at least some of the second voxels also labeled as belonging to the first segment, calculating first distances from the first voxels to the first boundary, calculating second distances from the second voxels to the second boundary, minimizing an energy function as a function of the first and second distances and a spatial exclusion constraint such that the first voxels are exclusive to the first segment and the second voxels are exclusive to the second segment, and generating an image of the first and second segments after the minimizing.

In a third aspect, a non-transitory computer readable storage medium has stored therein data representing instructions executable by a programmed processor for multiple object segmentation for three-dimensional computed tomography. The storage medium includes instructions for identifying locations of a first object from computed tomography information, identifying locations of a second object from the computed tomography information, determining the locations of the first and second objects that overlap, altering each of the locations of the overlap to be exclusive to the first or second object, and avoiding altering of the locations outside the overlap.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXEMPLARY EMBODIMENTS

Automatic segmentation of multiple adjacent objects is provided. Any objects represented by computed tomography (CT) data may be segmented. For example, two different organs are segmented. In another example used in embodiments discussed herein, adjacent bones are segmented. Locations represented by CT data are labeled as belonging to one or the other bone, such as a tibia or femur. Joint multi-bone segmentation is performed automatically from three-dimensional (3D) CT images.

Automatic bone segmentation from 3D CT images is a useful yet challenging task in many clinical applications. In particular, when the neighboring bones around human joints are very close and even touch each other, conventional bone segmentation methods are prone to producing the overlap error, especially if the bones are segmented individually. A fully automated, computationally efficient, and accurate joint segmentation system is provided for multiple bone segmentation. In one embodiment, each bone is initially segmented with a marginal space learning (MSL) framework for pose estimation and non-rigid boundary deformation. To eliminate the segmentation overlap, the bones are re-segmented with confidence maps derived from the initial segmentation results and spatial exclusion constraints between neighboring bones in a Markov random field (MRF). As a result, the overlap is effectively removed by re-segmentation. Furthermore, because the re-segmentation is only applied to the local overlapped area of the initial segmentation results, the re-segmentation has only a slight computational cost. This joint segmentation may reduce the segmentation overlap error by up to 100% compared to the ground truth with an extra computation of about 1 second.

Figure 2:
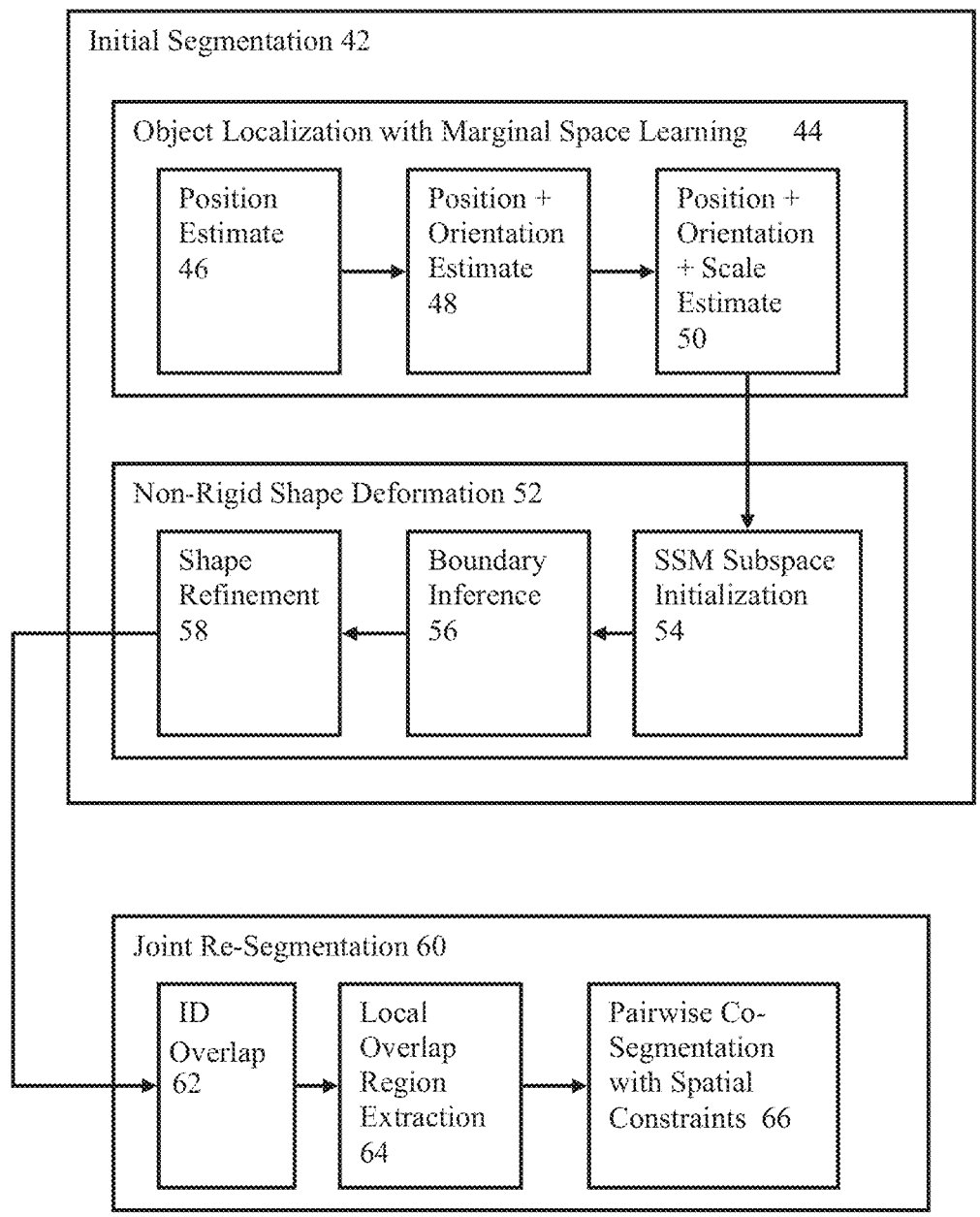
FIG. 2 illustrates one embodiment of a method for multiple object segmentation for three-dimensional computed tomography.
Figure 3:
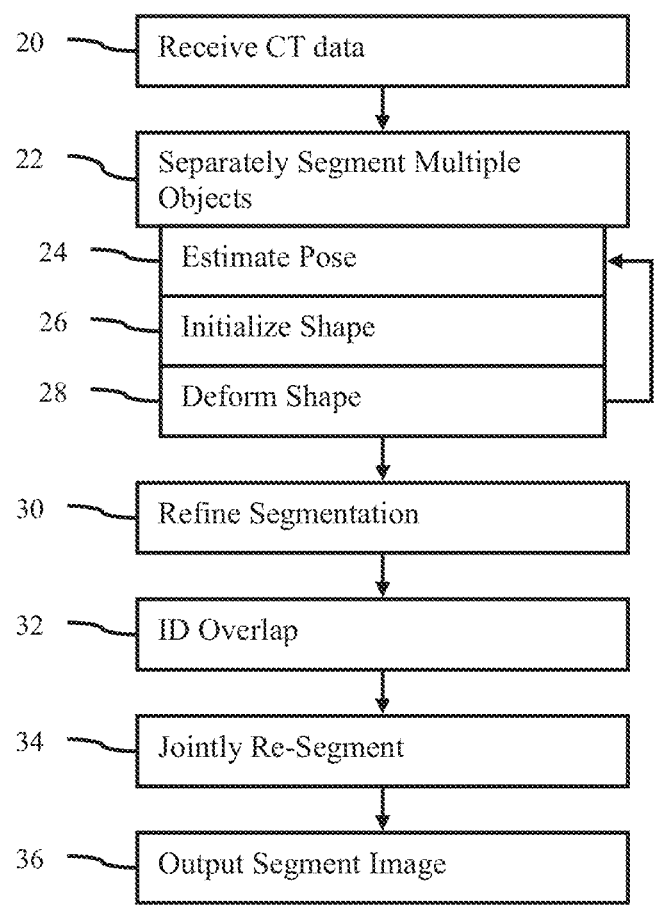
FIG. 3 is a flowchart diagram of another embodiment of a method for multiple object segmentation for three-dimensional computed tomography.

FIGS. 2 and 3 show embodiments of methods for multiple object segmentation for three-dimensional computed tomography. The methods are implemented using the system of FIG. 6, a processor, a server, a computer, and/or a different system. In general, a processor receives 3D CT data and performs the acts of the method to output an indication of different locations for adjacent objects represented by the 3D CT data.

Additional, different or fewer acts may be provided than shown in FIG. 2 or 3. For example, acts for accessing other types of data, acts for transmitting an output, and/or acts for storing the segmentation are provided. As another example, other initial segmentation acts are provided (e.g., acts 24-30 or 44-58 are replaced). Any segmentation of the individual objects may be used. As another example, re-segmentation limited to overlapping locations is provided without using confidence mapping. The acts are performed in the order shown or different orders.

In the embodiment represented by FIG. 2, the automatic segmentation includes an initial segmentation in act 42 and joint re-segmentation in act 60. In the initial segmentation of act 42, each bone is separately detected and segmented. The bone is first localized with marginal space learning in act 44. The best or group of best similarity transformations of the target bone is searched in a given volume. The position is found in act 46, then the orientations of the top position candidates are found in act 48, and then the scales of the top position+orientation candidates are found in act 50. Then, learning based 3D boundary detectors are used to infer the initial shape in act 54 and guide the shape deformation in the statistical shape model (SSM) space in act 56. The derived shape is further refined in act 58 using graph based segmentation algorithm to better fit the image data. Other acts may be used.

Because each bone is separately segmented, segmentation overlap may occur between neighboring bones. To remove the overlap error, joint re-segmentation is performed in act 60. Overlap is identified in act 62 and the local region of overlap is extracted in act 64. The labels for the overlap region are optimized for neighboring bones simultaneously with spatial exclusion constraints.

FIG. 3 represents the same or similar acts of FIG. 2. The methods of FIGS. 2 and 3 are discussed together below.

In act 20, CT data is received. The CT data is received by scanning a patient. An x-ray source and detector are rotated about a patient to acquire x-ray projections through a volume of the patient. The detected intensities are reconstructed into data representing the volume. In alternative embodiments, the CT data is received from memory, such as loading data from a DICOM archive system.

The CT data represents the patient. Parts or all of different organs, tissue types, bones, or other anatomical structure are represented by the data. For example, the data represents parts of the tibia and femur at the knee joint. Other tissue, such as other bones, may also be represented in the CT data.

The 3D CT data has any format. In one embodiment, the 3D CT data is formatted in a regular grid in a Cartesian coordinate system. Different grid locations or voxels represent different spatial locations within the scanned volume of the patient. The 3D CT data as received or after reception may be processed to remove background, soft tissue, tissue not of interest or other pre-segmentation operation.

In acts 22 and 42, an initial segmentation is performed. The initial segmentation includes locating the object of act 44 or estimating the pose in act 24 and includes fitting a shape in act 52 or acts 26 and 28. Additional, different, or fewer approaches may be used for performing initial segmentation.

The initial segmentation is for individual objects. In the bone example, the tibia and femur are detected and segmented as individual objects rather than a joint object. In act 22, the multiple objects are separately segmented. Locations of one object are determined using the CT data. Locations of the other object are determined using the CT data. The same process may be applied, but different classifiers, inputs, or goals are used to find the different bones. Different processes may be used for the different objects. The voxels of each bone are located as separate objects without regard to any overlap or the location or position of other objects. One object is located independently of the other object. In alternative embodiments, features, location, or other characteristics of one object are used to segment another object. While information about one object is used for segmenting another object, the segmentation of both objects is not spatially restricted to avoid overlap. The segmentation is separate since overlap may exist.

The initial segmentation labels the voxels of the CT data. If a voxel belongs to the object, the voxel is labeled as such. If the voxel does not belong to the object, the voxel is labeled as such. The voxel labels indicate voxels within the object and/or at the boundary of the object.

By separate segmentation of the different objects, the labels for a given voxel may belong to none, one, or multiple objects. One or more voxels or locations are labeled as or included as part of two or more different segments. For example, a group of voxels are labeled as belonging to the tibia and also labeled as belonging to the femur.

Any segmentation may be used for the individual segmentation. In embodiments represented in FIGS. 2 and 3, confidence maps are used in the individual segmentation. A confidence map is provided for each of the objects. In other embodiments, confidence mapping is not used.

Acts 44-58 and 24-28 show two embodiments for individual segmentation. In the discussion below, the segmentation is discussed for a given object. The segmentation is repeated for a different object.

In act 24, a pose of the object is estimated. The pose is position, orientation, and/or scale. Any parameter structure for pose may be used. The pose may not include the boundary or otherwise segment particular locations, but instead indicates a parameterized or generalized location of the object, such as with a bounding box, skeleton, or other parameterization.

Act 44 provides an example pose estimation, but other pose estimations may be used. A marginal space learnt discriminative classifier or classifiers are trained to estimate the pose. Other classifiers may be used. The input features to the classifier are steerable, three-dimensional Haar, and/or input features of the CT data. The classifier is machine trained from annotated or ground truth training data to classify the pose from the input. A matrix or other function is learned by data processing. More than one classifier may be trained, such as training separate classifiers for each of the position, orientation and scale estimations.

In one embodiment, the target bone is first detected from the 3D CT data by searching for the optimal similarity transformation parameters in a given volume I. The similarity transformation parameters, or pose parameters, are determined by nine parameters, translation $t=(t_x,t_y,t_z)$, orientation $r=(r_x,r_y,r_z)$ and anisotropic scaling $s=(s_x,s_y,s_z)$. In other embodiments, fewer, additional, or different parameters are used to characterize the pose. The pose estimation task can be formulated by maximizing the posterior probability as follows:

$$(\hat{t},\hat{r},\hat{s})=\arg\max P(t,s,r|I) \text{ for } t,s,r \qquad (1)$$

Solving the posterior probability involves the search in a nine dimensional parameter space, which can be very computationally expensive in practice. Marginal space learning is applied to decompose the whole search space into marginal space inference. As shown below, the object localization is split into three steps: position, orientation, and scale. Since the output of each step is a number (e.g., 100-1000) of candidates from that step, the search is characterized as position estimation, position-orientation estimation, and full similarity transformation estimation of acts 46, 48, and 50. After each step only a limited number of best candidates are kept to reduce the search space and speed up the inference. The marginal space solution of the posterior probability function is expressed as:

$$(\hat{t},\hat{r},\hat{s})=\arg\max P(t|I)P(r|I,t)P(s|I,t,r)\approx\arg\max P(t|I)$$
$$\arg\max P(r|I,\hat{t})\arg\max P(s|I,\hat{t},\hat{r}) \qquad (2)$$

To learn the marginal posterior probabilities, discriminative classifiers such as probabilistic boosting trees (PBT) or probabilistic boosting networks may be used. 3D Haar features are used for location detection and steerable features are used for orientation and scale inferences.

Figure 4A:
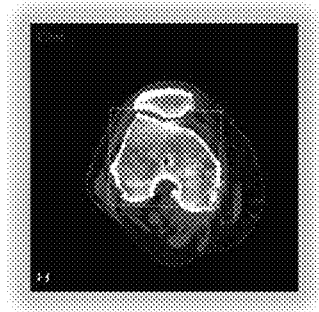
FIGS. 4A, 4B, and 4C are computed tomography images representing different stages of segmentation.

The output is a pose. The pose may be represented as a line, points, box, cube or other shape. FIG. 4A shows the pose as a rectangular box with a position, orientation, and scale fit to the object. The pose parameters are represented as a bounding box. Other representations or no representation may be used. The pose is or is not displayed to the user.

In act 52, the shape of the object is determined. For example, the boundary of the bone is located. The boundary and determination are limited to the bounding box and/or use the pose estimation to avoid improper placement.

In act 26, a shape for the object is initialized. In act 54, the initialization uses a statistical shape model, but other initialization may be used. For example, a random walker, direction filtering, thresholding, or other object detection is performed.

The statistical shape model is transformed to the pose. The statistical shape model is specific to the object and represents the average and/or deviation from average of the object as represented in CT data. After pose estimation, the shape of the target object is initialized based on the statistical shape model (SSM) as follows:

$$x=f(\mu+\Sigma c_i v_i, \hat{t}, \hat{r}, \hat{s}) \qquad (3)$$

where the sum is from i=1 to N, x denotes the initialized shape, f is the rigid transformation with the pose parameters $(\hat{t}, \hat{r}, \hat{s})$ estimated by the pose, $\mu$ and v represent the mean and leading eigenvectors of the statistical shape model obtained from training annotations, N is the dimension of the shape variation subspace (e.g., 3 but may be another number), and $c=(c_i, i=1, \ldots, N)$ are the shape variation coefficients inferred using machine learning techniques.

Any machine learning for the coefficients may be used, such as a probabilistic boosting tree or a probabilistic boosting network. The coefficient learning is represented as:

$$(\hat{c})=\arg\max P(c|I,\hat{t},\hat{r},\hat{s}) \qquad (4)$$

The learned coefficients represent a model. Rather than learning a classifier to apply to the CT data of a given patient, the model is learned for application to any number of patients without input of patient specific CT data. Any input features from the training data may be used, such as steerable features. The average represented in the model provides the initial shape.

As shown in equation 4, the inference of shape variation coefficients can be viewed as an extended step in the general marginal space learning framework for non-rigid deformation.

In act 28, the shape provided by the statistical or other model is deformed to the CT data for this particular placement. The initialization locates the average of the statistical shape model based on the pose. The model is then fit to the CT data for the patient under examination. The model is deformed based on the statistics of the statistical shape model as fit to the CT data.

Act 56 provides one example fitting. In act 56, the boundary is inferred from the statistical shape model and the CT data. The initialized shape is further deformed with boundary detectors. Any boundary detector accounting for the deviation or variation probabilities of the statistical shape model may be used. In other embodiments, the boundary detector uses the average shape and CT data without further deviation limits or statistics. For example, the average boundary indicates a localized search region for boundary detection but does not otherwise limit the boundary detection.

In one embodiment, boundary detection is formulated as a classification problem. The model establishes initial starting points for the boundary, such as represented in a mesh. The classification determines whether there is a boundary passing point (X, Y, Z) with orientation (Ox,Oy,Oz). The boundary detectors are used to move the mesh control points on the current estimated shape surface (e.g., average shape position of the statistical shape model) along its normal direction to an optimal position relative to the CT data of the patient. The classification score from the boundary detector is the highest, lowest or other output indicating an optimal fit for a mesh point. After adjustment, the deformed shape is projected to the statistical shape model subspace to smooth out the surface. For example, the dimension of the statistical shape model subspace is selected to capture 98% shape variations from the training annotations. The statistical shape model is fit to the CT data or acts as an input or limitation on classification of a location as a boundary or not.

Figure 4B:
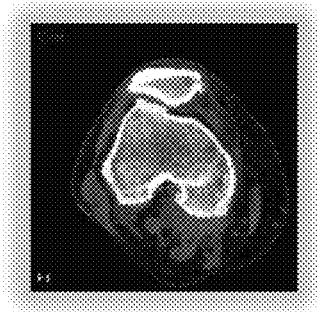

FIG. 4B shows example derived shape as an outline after boundary deformation fits the image mostly quite well. Some errors due to the loss of shape details by the statistical shape model, as well as possible boundary detection errors, may exist. FIG. 4B is shown to represent the concept and may or may not be shown to the user. Other segmentation approaches may be used, such as without pose estimation, without statistical shape modeling, without marginal space learning, without machine learnt classifiers, and/or with other processes.

In acts 30 and 58, the segmentation is refined. The segmentation is altered, such as by filtering or other process. Any refinement may be used. The refinement may be optional.

In one embodiment, the segmenting is refined using a confidence map for the segmentation. A graph-based energy function is minimized based on the confidence map. Any confidence map may be used, such as an output from probabilistic classifiers used for detecting the boundary. The confidence map represents a likelihood, score, or level of confidence that a given voxel indicated as being part of the object is part of the object. In one embodiment, the confidence map is calculated based on distances of voxels from an object boundary. For voxels labeled as being part of the object, the distance to a nearest boundary location of the object is calculated and used to determine the confidence. In general, the voxels within the object but further away from the boundary are more likely members of the object than voxels within the object but closer to the boundary. Distance maps are used as confidence maps with any function assigning confidence based on the distance, such as the inverse of distance alone being the confidence (or distance from the boundary being confidence where higher numbers represent greater confidence).

One example approach refines the segmentation to better fit to the CT data. To better fit the CT data, the graph based energy function is represented as:

$$E(L)=\Sigma D_p(L_p)+\Sigma V_{p,q}(L_p,L_q) \qquad (5)$$

where the sum of $D_p(L_p)$ is of the members of the volume P, the sum of $\Sigma V_{p,q}(L_p,L_q)$ is of the members p, q of the set of pairs of neighboring voxels N, where $L=\{Lp|p \in P\}$ is the binary labeling ($Lp \in \{0, 1\}$) of volume P, and Dp(Lp) is the unary data term, which is defined as:

$$D_p(L_p)=L_p(1-g(M(p)))+(1-L_p)g(M(p)) \qquad (6)$$

M(p) measures the signed shortest distance of voxel p to the boundary of the segmentation after boundary deformation. M(p)>0 when p lies inside the segmentation (foreground), M(p)<0 if p is outside the segmentation (background), and M(p)=0 if p is located on the segmentation boundary. M can be viewed as the confidence map of the previous segmentation. The larger (or smaller) M(p) is, the more likely voxel p should be classified as the foreground (or background). When voxel p approaches the segmentation boundary, (M(p) ≈0), label Lp becomes more uncertain, and more likely to be updated by the segmentation refinement. g(.) is any function to map the distance to confidence, such as the sigmoid function defined as:

$$g(x)=1/(1+e^{-x/\tau}) \qquad (7)$$

where $\tau$ is the parameter that controls the range of uncertainty of the previous segmentation result (e.g., 3-5 mm). In equation 5, N is the set of all pairs of neighboring voxels, and $V_{p,q}$ is the pair-wise interaction term:

$$V_{p,q}=\lambda e^{-((Ip-Iq)squared/2\sigma squared)}\delta(L_p \neq L_q) \qquad (8)$$

where $\delta(.)$ is the Kronecker delta function:

$$\delta(L_p \neq L_q)=1 \text{ if } I_p \neq I_q \text{ and } 0 \text{ if } I_p=I_q.$$

and where $\lambda$ and $\sigma$ are the regularization parameter and contrast coefficient, respectively. Any values may be used such as 1-2 for $\lambda$ and 30-175 for $\sigma$. $I_p$ and $I_q$ denote the intensities of voxels p and q, respectfully. The pairwise term encourages the neighboring voxel with similar intensities to be assigned the same label.

The segmentation is refined by minimizing the energy function of equation 5. Any optimization of the energy function may be used, such as solving using the min-cut/max-flow algorithm with polynomial time complexity. Other solutions, functions, other graph-based cost functions, or other approaches to refinement may be used.

Figure 4C:

FIG. 4C shows an example of the improved result after graph-based segmentation refinement. One or more errors are removed. The result is a segment representing the object as labeled in the CT data. Other segmentation may be used.

Figure 1:
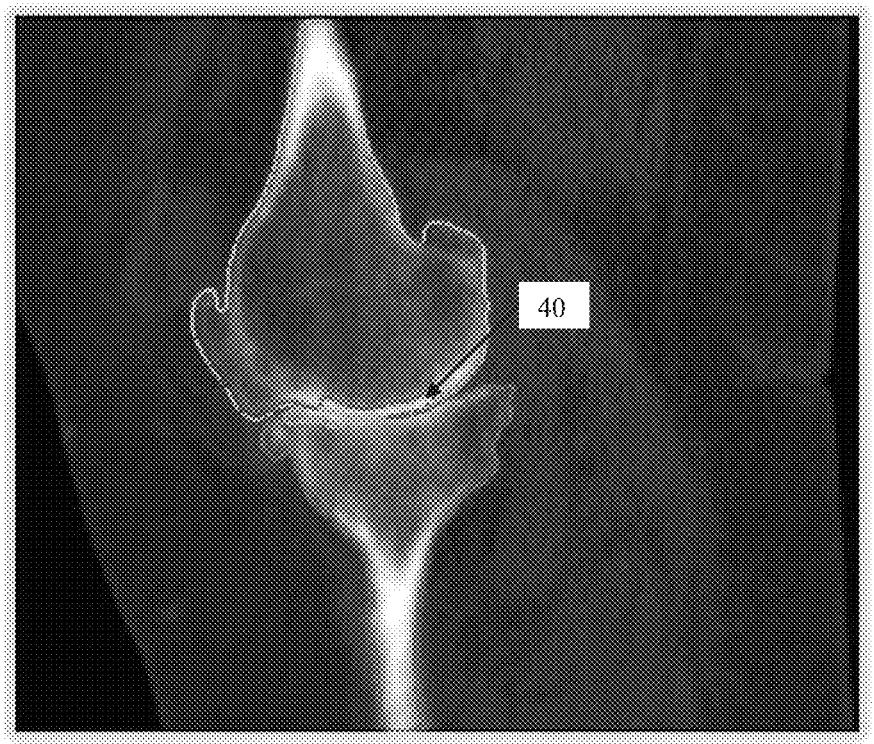
FIG. 1 is a computed tomography image with segmentation of two objects showing overlap of the objects.

Multiple objects are separately or individually segmented. For adjacent objects, one or more voxels may be labeled as belonging to multiple objects. Although the individual segmentation may usually achieve good results, the segmentation of each individual bone is performed separately without any spatial constraints. Hence, the overlap error may occur when two objects become very close to each other, as shown in the example of FIG. 1 for two bones.

In acts 60 and 34, re-segmentation is performed jointly to remove the overlap error. Joint re-segmentation incorporates a spatial constraint to prevent overlap. The segmentations are further refined using the spatial constraint, or the refinement of acts 30 and 58 incorporates the spatial constraint.

To make the re-segmentation more computationally efficient, the re-segmentation is only performed for voxels labeled as belonging to multiple objects or only for the overlap locations. In acts 32 and 62, the overlap locations are identified. The labels of voxels are checked to determine whether a given voxel is labeled by the individual segmentations as belonging to more than one object. Alternatively, the re-segmentation is performed for a local region of a pre-determined or user set size around and including the overlapping locations. In yet other embodiments, the re-segmentation is performed for all locations or voxels.

In act 64, the local overlap region is extracted. Only the CT data for the overlap is used or only the data in a region around the overlap is used. By data masking other data or by removing the values for voxels in the region or overlap, the CT data for re-segmentation is extracted. Alternatively, the CT data is used without extraction so that adjacent voxels are available for re-segmentation calculations.

In act 34, the results of the individual segmenting are adjusted jointly. The labels for the locations are altered to be exclusive to only one object instead of two or more. Any criteria may be used to select one of multiple objects for a given voxel. The criteria are joint, so incorporates both objects into the consideration.

In one embodiment, confidence maps are used for joint re-segmentation. The confidence maps from the two or more objects indicate likelihood of the location or voxel being a member of the respective object. The object with the highest confidence is selected as the object for the voxel. Other approaches to avoid non-smooth boundaries may be used for altering jointly.

Rather than mere selection, a graph-based energy function may be used. In act 66, pairwise co-segmentation with spatial constraints is used. A graph-based energy function constrained to label each voxel without overlap of the objects is minimized. The distances or the confidence are used in combination with the spatial constraint to alter the voxel labels to be exclusive to a single or no object. With a specific spatial exclusion constraint introduced, the re-segmentation guarantees the complete removal of the overlap error.

The pair of objects are labeled as A and B. $L_A$ and $L_B$ stand for the labeling of bone A and B, respectively. Voxel p is inside bone A if $L_{A(p)}=1$ and otherwise if $L_{A(p)}=0$, likewise for bone B. The energy function of equation 5 is extended to the case of two objects as follows:

$$E(L_A, L_B) = E(L_A) + E(L_B) = \Sigma D_{A(p)}(L_{A(p)}) + \Sigma V_{A(p,q)}(L_{A(p)}, L_{A(q)}) + \Sigma D_{B(p)}(L_{B(p)}) + \Sigma V_{B(p,q)}(L_{B(p)}, L_{B(q)}) \quad (9)$$

where the sums of D are of the voxels in the volume P, the sums of V are of the voxels in the set N, and where all the symbols have the same meaning as in equation 5. Equation 9 is applied separately and in addition to the use of equation 5 in segmentation. Equation 9 is used for the joint re-segmentation, so M is now based on the segmentation results after refinement of acts 30 and 58. As shown in equation 9, the minimization of $E(L_A, L_B)$ can be decomposed to the minimization of $E(L_A)$ and $E(L_B)$ separately because no interaction terms between $L_A$ and $L_B$ exist in the energy function of equation 9. Objects A and B are essentially segmented separately.

For joint re-segmentation, a spatial exclusion constraint exists between $L_A$ and $L_B$ because object A and B cannot overlap in the space. If $L_{A(p)}=1$, $L_{B(p)}$ must=0, and vice versa. This spatial constraint is incorporated into the energy function of equation 9 by adding the pairwise terms as follows:

$$E^-(L_A, L_B) = E(L_A, L_B) + \Sigma W(L_{A(p)}, L_{B(p)}) \quad (10)$$

where $W(L_{A(p)}, L_{B(p)}) = +\infty$ if $L_{A(p)} = L_{B(p)} = 1$ and otherwise is 0.

The optimal solution that minimizes the energy function $E^-(L_A, L_B)$ guarantees that $L_{A(p)}$ and $L_{B(p)}$ cannot be both 1 at the same time ($\forall p \in P$). The introduced pairwise term $W_{A(p), B(p)}(L_{A(p)}, L_{B(p)})$ is super-modular because $W(0, 1)+W(1, 0)<W(0, 0)+W(1, 1)$, so cannot be directly optimized via the min-cut/max-flow algorithm. To address this problem, the binary meaning of label $L_B$ is flipped to $L^-_B=1-LB$ or otherwise altered to avoid this ambiguity. The energy function $E^-(L_A, L_B)$ becomes sub-modular everywhere and the min-cut/max-flow solution may be used to find the optimal labeling of $L_A$ and $L_B$ jointly. Alternatively, a different minimization solution may be used.

Since the minimization is performed only for a local region associated with the overlap, only voxels in the overlap are altered. The adjustment is performed only for the identified overlap voxels. This avoids altering the labels of voxels outside of the overlap region. The joint segmentation with spatial constraints is applied only to a local overlap region generated from the initial segmentation of each individual bone. If there is no overlap in the initial segmentation, the joint segmentation is skipped. This results in efficient computation as compared to running joint segmentation with spatial constraint priors from the beginning (i.e., as compared to joint segmentation without separate individual segmentation).

Figure 5:
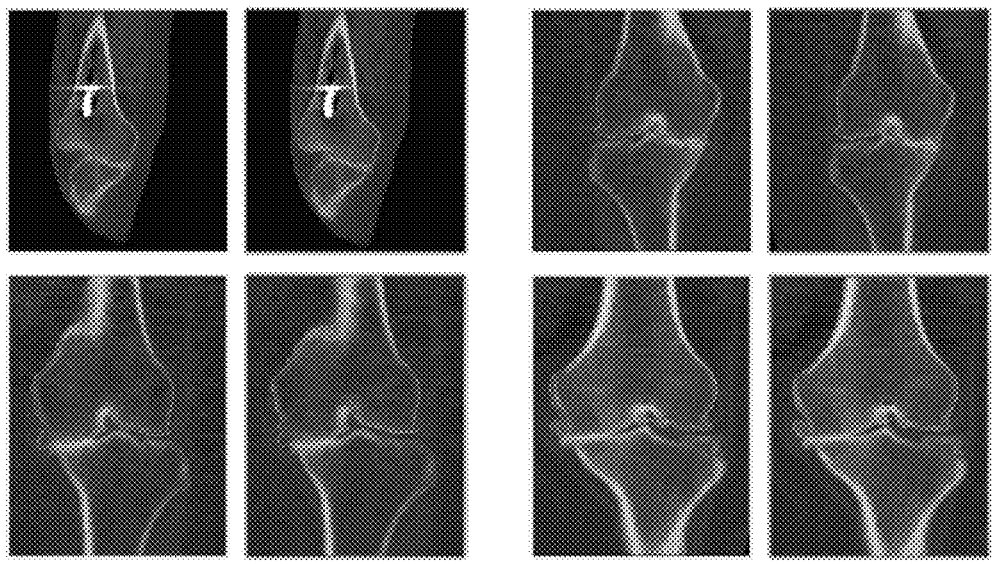
FIG. 5 shows computed tomography images with overlapping segmentations and re-segmentation correction of the overlap.

In act 36, an image is output. The image shows the objects with the adjusted results of the segmenting. A graphic, highlighting, colorization, or other visual cue is added to or included in the image to distinguish one object from another. For example, one bone or a boundary around one bone is a different color than the bone or boundary of another bone. The image is generated after minimization so that no parts of the adjacent bones are indicated as belonging to both bones. FIG. 5 shows four examples of bones with overlap (right side of each pair) resulting from individual segmentation and the results displayed after joint re-segmentation (left side of each pair). The boundaries are indicated by differently colored graphic lines.

The image is a three-dimensional rendering to a two-dimensional image of the CT data from a user or processor selected viewing direction. The rendering may use surface, projection, or other rendering. In other embodiments, the image is a two-dimensional image representing a plane through the volume, such as provided with a multi-planar reconstruction or user selected viewing plane.

Figure 6:
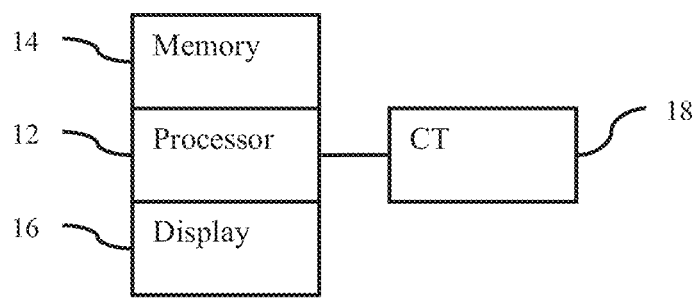
FIG. 6 is a block diagram showing one embodiment of a system for multiple object segmentation for three-dimensional computed tomography.

FIG. 6 illustrates an exemplary system or platform for automated orthopedic surgery planning. The system includes a processor 12, a memory 14, a display 16, and a CT scanner 18. The processor 12, memory 14 and display 16 are a computer, laptop, tablet, workstation, server, CT workstation, or other processing device. Additional, different, or fewer components may be provided. For example, a user input, network interface, and/or multiple processors are provided. As another example, the CT scanner 18 is not provided.

The CT scanner 18 includes a source and detector. A gantry rotates the source and detector about a patient. A C-arm may be used instead of the gantry for CT-like imaging that produces CT data. The CT scanner 18 scans the patient with x-rays. The processor 12 or other processor (e.g., of the CT scanner 18) reconstructs the CT data representing the volume from the detected x-ray information.

The display 16 is a CRT, LCD, flat panel, plasma, projector, printer, combinations thereof or any other now known or later developed display. Using a graphics processing unit or other hardware or software, the display 16 generates black and white or color pixels in a Cartesian or other coordinate format for presenting a graphical user interface, CT image, segment information, a CT image with segment information, or combinations thereof. In alternative or additional embodiments, the segments are output to the memory 14, a different memory, transmitted over a network, or provided to the processor 12 for further operations (e.g., surgical planning, implant design, or cutting guide design).

The memory 14 stores data, such as confidence maps, distances, classifiers, models, calculated input features, images, CT data, or other information used for multiple bone segmentation for three-dimensional computed tomography. Other data may be stored.

Alternatively or additionally, the memory 14 is a non-transitory computer readable storage medium storing data representing instructions executable by the programmed processor for multiple object segmentation for three-dimensional computed tomography. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, applications specific integrated circuit, digital signal processor, field programmable gate array, multiple processors, analog circuit, digital circuit, network server, graphics processing unit, combinations thereof, or other now known or later developed device for performing segmentation. The user may input an activation command, select a patient, select patient bone data, select a surgical procedure or otherwise initialize a workflow calling for segmentation. The processor 12 automatically segments multiple objects, including adjacent objects, free of overlap. By sequencing through the process, the processor 12 is configured to automatically segment without further user input, such as no input of a location or region in an image. In alternative embodiments, the user may confirm and/or alter segmentation, such as by inputting one or more locations.

In one embodiment, the processor 12 is an Intel© Core™ CPU operating at 2.29 GHz with 3.23 GB of RAM for the memory 14. For each initial segmentation (see FIG. 2), the processor 12 takes about 20-30 seconds, depending on the bone being segmented. The overlap region is usually much smaller than the whole volume. Where the joint re-segmentation is only applied to the local overlap region generated from the initial segmentations, the joint re-segmentation may be computed efficiently. For example, joint re-segmentation is performed in about 1 second on the average. If the initial segmentation results do not overlap, the joint re-segmentation is skipped with negligible extra computational cost. The joint re-segmentation reduces overlap error by 100%, but may reduce by less in other embodiments.

The segmentation includes use of a machine-learned classifier. One or more machine-learned detectors or classifiers are used to detect the pose, boundary, statistical shape, and/or boundary deformation. Any machine learning may be used. A single class or binary classifier, collection of different classifiers, cascaded classifiers, hierarchal classifier, multi-class classifier, model-based classifier, classifier based on machine learning, or combinations thereof may be used. Multi-class classifiers include CART, K-nearest neighbors, neural network (e.g., multi-layer perceptron), mixture models, or others. A probabilistic boosting tree may be used. Error-correcting output code (ECOC) may be used.

The classifier is trained from a training data set using a computer. Any number of expert annotated sets of data is used. For example, about 200 hundred volumes representing the objects of interest are annotated. Different training sets or the same training sets with different annotations are used to machine train classifiers for different objects, different boundary points, different pose parameters, or other different uses of classifiers. The annotation indicates a ground truth, such as an object boundary within the volumes or planes extracted from the volumes. This large number of annotations allows use of machine learning to learn relevant features over a large pool of possible features.

Any features may be used. The features include 3-D Haar, wavelet-like, intensity, steerable, gradient, and/or other features. The classifier learns various feature vectors for distinguishing between a desired anatomy and information not being detected. The classifier is taught to distinguish based on the features. Features that are relevant to the segmentation of anatomy are extracted and learned in a machine algorithm based on the experts' annotations. The training determines the most determinative features for a given classification and discards non-determinative features. Different combinations of features may be used for detecting different objects, the same object at different resolutions or times, and/or the same object associated with different location, translation, rotation, or scale. For example, different sequential classification stages utilize different features computed from the 3D volume data. Each classifier selects a set of discriminative features that are used to distinguish the positive target from negatives.

The data used for the classifiers is CT data. The features are extracted from the reconstructed CT intensities. The CT data is raw, reconstructed data. In other embodiments, the data is filtered or otherwise processed prior to use for segmentation. Other types of imaging (e.g., different modality) or patient specific non-imaging data (e.g., age, weight, and/or other diagnostically relevant information) may be used.

Once trained, the classifier is used as part of segmentation. By inputting the patient-specific data corresponding to discriminative features of one or more classifiers, the locations for different objects are determined. The trained classifiers are represented by matrices where the input feature values are input to the matrices and the learned output results. Other structures than matrices may be used to embody the learnt classifiers.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method for multiple bone segmentation for three-dimensional computed tomography, the method comprising:
   receiving computed tomography (CT) data representing first and second bones of a patient;
   separately segmenting, by a processor, the first and second bones;
   refining, by the processor, just the segmenting of the first bone using a first confidence map of the segmenting, the first confidence map being a first spatial distribution over voxels;
   refining, by the processor, just the segmenting of the second bone using a second confidence map of the segmenting, the second confidence map being a second spatial distribution over the voxels;
   then, adjusting, by the processor, results of the segmenting of the first and second bones jointly using the first and second confidence maps; and
   outputting an image showing the first and second bones with the adjusted results of the segmenting.

2. The method of claim 1 wherein receiving comprises receiving the CT data representing a three-dimensional volume of the patient, the three-dimensional volume including the first and second bones and including other tissue.

3. The method of claim 1 wherein separately segmenting comprises segmenting the first bone individually from the CT data and segmenting the second bond individually from the CT data.

4. The method of claim 1 wherein separately segmenting comprises locating voxels representing the first bone in a process and locating voxels representing the second bone in a repetition of the process, the process using different classifiers for the different bones.

5. The method of claim 1 wherein separately segmenting comprises estimating first and second poses of the first and second bones, the first and second poses including position and orientation.

6. The method of claim 5 wherein estimating the first and second poses comprises estimating with marginal space learnt discriminative classifiers using three-dimensional Haar features of the CT data.

7. The method of claim 5 wherein separately segmenting comprises initializing first and second shapes for the first and second bones with first and second statistical shape models transformed to the first and second poses, respectively.

8. The method of claim 7 wherein separately segmenting comprises deforming the first and second shapes as a function of the first and second statistical shape models and the CT data.

9. The method of claim 1 wherein refining for the first and second bones comprise minimizing a graph-based energy function, where the graph-based energy function is a function of the first and second confidence maps, respectively.

10. The method of claim 9 wherein refining for the first and second bones comprise refining as a function of the first and second confidence maps comprising distance maps with greater confidence for voxels at a greater distance from boundaries.

11. The method of claim 1 wherein adjusting comprises minimizing a graph-based energy function constrained to label each voxel without overlap of the first bone with the second bone.

12. The method of claim 1 further comprising:
identifying voxels labeled as both the first and the second bone; and
performing the adjusting only for the identified voxels.

13. The method of claim 1 wherein outputting comprises displaying the image with the first bone distinguished from the second bone.

14. In a non-transitory computer readable storage medium having stored therein data representing instructions executable by a programmed processor for multiple object segmentation for three-dimensional computed tomography, the storage medium comprising instructions for:
labeling first voxels of computed tomography data as belonging to a first segment of a first bone having a first boundary;
labeling second voxels of computed tomography data as belonging to a second segment of a second bone having a second boundary, at least some of the second voxels also labeled as belonging to the first segment;
calculating first distances from the first voxels to the first boundary of the first bone;
calculating second distances from the second voxels to the second boundary of the second bone without referencing the first boundary of the first bone;
minimizing an energy function as a function of the first and second distances and a spatial exclusion constraint such that the first voxels are exclusive to the first bone and the second voxels are exclusive to the second bone, the spatial exclusion being a check for bone overlap using the labeling as being the first and second bones; and
generating an image of the first and second segments after the minimizing.

15. The non-transitory computer readable storage medium of claim 14 wherein minimizing is performed only for a local region associated with the second voxels also labeled as belonging to the first segment.

16. The non-transitory computer readable storage medium of claim 14 wherein labeling the first and second voxels comprise separately segmenting the first and second segments as the first and second bones.

17. The non-transitory computer readable storage medium of claim 14 wherein labeling the first and second voxels comprise separately determining first and second position and orientation poses, fitting first and second statistical shape models, and minimizing first and second cost functions for the first and second fit statistical shape models as a function of the first and second distances for the first and second segments, respectively.

18. In a non-transitory computer readable storage medium having stored therein data representing instructions executable by a programmed processor for multiple object segmentation for three-dimensional computed tomography, the storage medium comprising instructions for:
identifying locations of a first object from computed tomography information;
identifying locations of a second object from the computed tomography information;
determining the locations of the first and second objects that overlap where the overlap locations are identified as being both the first and second objects;
altering each of the locations of the overlap to be exclusive to the first or second object; and
avoiding altering any of the locations outside the overlap such that locations of the first and second objects not being overlap locations are output as segmentation results.

19. The non-transitory computer readable storage medium of claim 18 wherein identifying the locations of the first and second objects comprise identifying for the first object independently of the second object and identifying for the second object independently of the first object.

20. The non-transitory computer readable storage medium of claim 18 wherein identifying the locations of the first and second objects comprises segmenting separately as a function of first and second confidence maps, respectively, and wherein altering comprises altering as a function of the first and second confidence maps jointly for the first and second objects.

* * * * *